US005472489A

United States Patent [19]

Sheiham et al.

[11] Patent Number: 5,472,489

[45] Date of Patent: Dec. 5, 1995

[54] SOLVENT COMPOSITIONS FOR USE IN PRESSURE-SENSITIVE COPYING PAPER

[75] Inventors: Ivan Sheiham, Marlow; Margaret P. Templey, Thame, both of England

[73] Assignee: The Wiggins Teape Group Limited, England

[21] Appl. No.: 141,606

[22] Filed: Oct. 27, 1993

Related U.S. Application Data

[62] Division of Ser. No. 899,308, Jun. 16, 1992, Pat. No. 5,281,266.

[30] Foreign Application Priority Data

Jun. 18, 1991 [GB] United Kingdom .................. 9113086

[51] Int. Cl.$^{6}$ .......................... C09D 191/00; C08K 5/10

[52] U.S. Cl. ......................... 106/311; 106/244; 106/266; 428/537.5

[58] Field of Search ................................ 106/244, 266, 106/317; 428/537.5

[56] References Cited

U.S. PATENT DOCUMENTS

| | | | |
|---|---|---|---|
| 2,712,507 | 7/1955 | Green et al. | 117/36 |
| 2,730,457 | 1/1956 | Green et al. | 117/36 |
| 3,016,308 | 1/1962 | Macaulay | 117/36.7 |
| 3,966,632 | 6/1976 | Colliopoulos et al. | 106/244 |
| 4,783,196 | 11/1988 | Eckstein et al. | 8/527 |
| 4,923,641 | 5/1990 | Eckstein et al. | 544/86 |
| 5,281,266 | 1/1994 | Sheiham et al. | 106/311 |

FOREIGN PATENT DOCUMENTS

| | | |
|---|---|---|
| 0024897 | 3/1981 | European Pat. Off. . |
| 0024898 | 3/1981 | European Pat. Off. . |
| 0086636 | 8/1983 | European Pat. Off. . |
| 0155593 | 9/1985 | European Pat. Off. . |
| 0234394 | 9/1987 | European Pat. Off. . |
| 0262569 | 4/1988 | European Pat. Off. . |
| 51-080685 | 7/1976 | Japan . |
| 59-164186 | 9/1984 | Japan . |
| 60-238140 | 11/1985 | Japan . |
| 1526353 | 9/1978 | United Kingdom . |

*Primary Examiner*—David Brunsman

*Attorney, Agent, or Firm*—Burns, Doane, Swecker & Mathis

[57] ABSTRACT

A solvent composition for use in pressure-sensitive copying papers comprises a mixture of vegetable oil and a mono- or di-functional ester of a fatty acid or other acid composed of a non-aromatic saturated or unsaturated straight or branched hydrocarbon chain and a single terminal carboxyl group.

10 Claims, No Drawings

SOLVENT COMPOSITIONS FOR USE IN PRESSURE-SENSITIVE COPYING PAPER

This application s a divisional of application Ser. No. 07/899,308, filed Jun. 16, 1992, now U.S. Pat. No. 5,281, 266.

This invention relates to solvent compositions for use in pressure-sensitive copying paper, also known as carbonless copying paper.

Pressure-sensitive copying paper is well-known and is widely used in the production of business forms sets. Various types of pressure-sensitive copying paper are known, of which the most widely used is the transfer type. A business forms set using the transfer type of pressure-sensitive copying paper comprises an upper sheet (usually known as a "CB" sheet) coated on its lower surface with microcapsules containing a solution in an oil solvent or solvent composition of at least one chromogenic material (alternatively termed a colour former) and a lower sheet (usually known as a "CF" sheet) coated on its upper surface with a colour developer composition. If more than one copy is required, one or more intermediate sheets (usually known as "CFB" sheets) are provided, each of which is coated on its lower surface with microcapsules and on its upper surface with colour developer composition. Imaging pressure exerted on the sheets by writing, typing or impact printing (e.g. dot matrix or daisy-wheel printing) ruptures the microcapsules, thereby releasing or transferring chromogenic material solution on to the colour developer composition and giving rise to a chemical reaction which develops the colour of the chromogenic material and so produces a copy image.

In a variant of the above-described arrangement, the solution of chromogenic material may be present as dispersed droplets in a continuous pressure-rupturable matrix instead of being contained within discrete pressure-rupturable microcapsules.

In another type of pressure-sensitive copying system, usually known as a self-contained or autogeneous system, microcapsules and colour developing co-reactant material are coated onto the same surface of a sheet, and writing or typing on a sheet placed above the thus-coated sheet causes the microcapsules to rupture and release the solution of chromogenic material, which then reacts with the colour developing material on the sheet to produce a coloured image.

The solvents used to dissolve the chromogenic materials in pressure-sensitive copying papers as described above have typically been products of the petrochemical industry for example partially hydrogenated terphenyls, alkyl naphthalenes, diarylmethane derivatives, dibenzyl benzene derivatives or chlorinated paraffins. The "prime solvents" are usually mixed with cheaper diluents or extenders such as kerosene, which although of lesser solvating power, give rise to more cost-effective solvent compositions.

Vegetable oils have been disclosed as solvents for use in pressure-sensitive copying papers, and are in principle an alternative to the use of petrochemical-based solvent compositions. However, to the best of our knowledge, there has been no commercial utilization of vegetable oil solvents in pressure-sensitive copying papers, even though proposals for use of vegetable oil solvents go back many years, see for example U.S. Pat. Nos. 2,712,507; 2,730,457 and 3,016,308.

European Patent Application No. 24898A and British Patent No. 1526353 each disclose solvent compositions for pressure-sensitive copying paper which comprise a blend of an aromatic hydrocarbon with specified aliphatic acid diesters. European Patent Application No. 24898A discloses also that the blend may additionally contain an "inert diluent". The examples given of such a diluent include vegetable oils such as castor oil, soybean oil and corn oil, but there is no exemplification or explicit disclosure of any solvent composition which actually contains a vegetable oil.

The use of phthalates, for example dibutyl phthalate, and certain other esters, for example maleates, as solvents or pigment-suspending media for pressure-sensitive copying paper has also been proposed, see for example U.S. Pat. No. 3,016,308 referred to above.

More recent disclosures of the use of vegetable oil solvents in pressure-sensitive copying paper are to be found, for example, in European Patent applications Nos. 86636A (page 4), 155593A (page 11), 234394A and, especially, in European Patent Application No. 262569A. The last-mentioned is of particular interest as it is specifically directed to the use of vegetable, animal or mineral oil solvents in pressure-sensitive copying paper. In contrast, the references to vegetable oil solvents in the other patents just referred to were generally made in passing, the main subject of the patent not being concerned with solvent compositions at all.

European Patent Application No. 262569A requires the use of triphenylmethane leuco dye chromogenic materials in conjunction with the vegetable, animal or mineral oils disclosed. These triphenylmethane leuco dyes are preferably carbinols or $C_1$ to $C_4$ alkoxy derivatives of carbinols. Such carbinols or carbinol derivatives differ from the phthalide chromogenic materials, e.g. Crystal Violet Lactone ("CVL") and fluoran chromogenic materials which have hitherto been the most widely used chromogenic materials in the art. A requirement for the replacement of tried and tested phthalide and fluoran chromogenic materials by relatively unproven, or at least less well-established, chromogenic materials of the triphenylmethane carbinol or carbinol derivative type would be a significant drawback to the use of vegetable oil solvents.

An important consideration in our evaluation of vegetable oil solvents has therefore been that these solvents should be capable of satisfactory use with well-established chromogenic materials of the phthalide and fluoran type. We have found that most of the widely-used phthalide and fluoran chromogenic materials present no serious problems when used with vegetable oil solvents, either as regards solubility or colour generating capability. However we did encounter one or more of the following problems:

1. Wide Primary Droplet Size Distribution on Emulsification

In order to encapsulate the oils, they must first be emulsified in an aqueous medium. The size of the droplets in this emulsion is a key parameter in determining the size of the final microcapsules. Wide variations in primary droplet size, and hence in microcapsule size, are disadvantageous, particularly in the case of excessively large microcapsules. These are particularly prone to damage and accidental rupture, and may also be more permeable than smaller capsules (i.e. the capsule contents are less well retained by the microcapsule walls and therefore can escape prematurely). This results in production of coloured spots and in general discolouration in CFB paper, since in a wound reel of CFB from the coating machine, the capsule coated (CB) surface of each ply within the reel is in close contact with the colour developer (CF) surface of the adjacent ply. Spot formation can also occur in finished pressure-sensitive copying sets, where CB and CF surfaces are also in contact.

In considering the problems just described, it should be borne in mind that the volume of chromogenic material solution in a spherical droplet is proportional to the cube of the radius of the droplet, and that what may seem to be a relatively minor oversizing can have very significant effects in the final product.

A wide primary droplet size distribution can also exacerbate the problem of post-printing discolouration (see below).

2. Post-printing Discolouration

When CB and CFB papers are subjected to a printing process as part of the production of business forms sets, a certain amount of microcapsule damage tends to occur, and this results in release of chromogenic material solution which can transfer to an adjacent CF surface and produce discolouration as a result of formation of many small coloured specks. This is known as "post-printing discolouration" (or "post-print blacking", or "post-print blueing" depending on the colour of the copy image).

3. Discolouration on Storage

It is found that CFB paper sometimes tends to discolour gradually on storage prior to use. The reasons for this include the presence in the microcapsule coating of a small proportion of unencapsulated chromogenic material solution, gradual permeation of chromogenic material solution through the microcapsule walls, and premature capsule damage as a result of the strains imposed by reel tensions, or by the weight of higher sheets in the case of stacked sheeted products. In each case, the free chromogenic material solution can potentially migrate up through the paper and into contact with the colour developer coating on the top surface. The effect is primarily seen as an overall greying (or blueing in the case of a blue-copy product) and is referred to generally as discolouration on storage.

It has now been found that the above-described problems can be eliminated or at least reduced, and also that an improved copy intensity can be obtained, if the vegetable oil solvent is used in conjunction with a mono- or di-functional ester of certain organic acids.

Accordingly, the present invention provides a solvent composition for use in pressure-sensitive copying paper and Comprising a vegetable oil, characterized in that the solvent composition also comprises a proportion of a mono- or di-functional ester of a non-aromatic mono-carboxylic acid having a saturated or unsaturated straight or branched hydrocarbon chain with at least three carbon atoms in the chain (i.e. in addition to the carboxyl carbon atom). The carboxyl group is preferably a terminal carboxyl group.

The invention also extends to pressure-sensitive copying paper comprising a solvent composition as just defined, either contained in microcapsules or otherwise present in the form of isolated droplets in a pressure-rupturable barrier.

The vegetable oil may be any of the commonly-available vegetable oils, for example rapeseed oil, sunflower oil, soybean oil, corn oil, coconut oil, palm kernel oil, palm oil, olive oil, groundnut oil, sesame oil, cottonseed oil, safflower oil, linseed oil, castor oil, babassu oil, tung oil, jojoba oil or oiticica oil. Rapeseed oil, soya bean oil, sunflower oil or corn oil is preferred. Certain of the oils just listed are solid or semi-solid at room temperatures, but this does not matter provided that they are used with an ester with which the oil will form a liquid blend of a workable viscosity.

Information on the chemical composition, extraction, refining and purification of vegetable oils is widely available, see for example "Kirk-Othmer Encyclopedia of Chemical Technology", third Edition, Volume 23 (section on "Vegetable Oils") and Volume 9 (section on "Fats and Fatty Oils"), published by John Wiley & Sons (Wiley-Interscience).

The ester used in the present solvent composition is preferably an ester of a fatty acid, i.e. an ester of an acid derivable from an animal or vegetable oil, and will hereafter be referred to for convenience as a "fatty acid ester". Whilst the expression "fatty acid" is not always defined consistently in technical reference books, the usage in this specification, i.e. as meaning an acid derivable from an animal or vegetable oil, is consistent with the definition in "Hawley's Condensed Chemical Dictionary", Eleventh Edition, revised by N. Irving Sax and Richard J. Lewis, St. published by Van Nostrand Reinhold Company. Fatty acids are composed of a saturated or unsaturated straight or branched hydrocarbon chain with a single terminal carboxyl group, the total number of carbon atoms present (including the carboxyl group) generally being an even number from 4 to 22.

By way of example, the fatty acid ester may be of a saturated straight or branched-chain aliphatic fatty acid such as myristic acid, capric acid, caprylic acid, stearic acid, isostearic acid, palmitic acid, or lauric acid, or of an unsaturated fatty acid such as oleic acid, or of an acid of mixed composition, for example coconut acid, i.e. a mixture of fatty acids derived from hydrolysis of coconut oil. The constituent fatty acids of coconut acid have chain lengths of 6 to 18 carbon atoms and are chiefly lauric, captic, myristic, palmitic and oleic acids. An ester of coconut acid will hereafter be referred to as a "cocoate", although the term "coconutate" is also in use (it should be noted that the expression "cocoate" has no connection with the acids present in cocoa oil or cocoa butter).

The ester moiety of the fatty acid or other ester used in the present solvent composition may vary widely. For example, it may have only one carbon atom, i.e. methyl, or several carbon atoms, for example isopropyl, octyl or 2-ethylhexyl. Such ester moieties are all mono-functional. An example of a suitable di-functional ester moiety is propylene glycyl (i.e. an ester moiety derived from propylene glycol).

We have so far found that the use of a tri-functional ester such as a glyceryl ester does not give the same benefits, perhaps because such esters are chemically similar to naturally-occurring tri-glycerides—thus a mixture of a vegetable oil and a glyceryl ester probably behaves in a manner similar to a blend of vegetable oils.

Numerous examples of mono- or di-functional esters of fatty acids as disclosed above are commercially available products, being used in industry for a variety of applications, particularly cosmetics and other personal care products. They can be manufactured by esterification, with suitable alcohols, of fatty acids derived by refining and/or distillation of crude vegetable oils. The alcohols required for esterification are widely available.

Specific examples of suitable fatty acid esters for use in the present solvent composition include the following, which may be used singly or in combination:

2-ethylhexyl cocoate(EHC)

isopropyl myristate (IPM)

methyl oleate (MO) (see note 1)

propylene glycol dicaprylate/caprate) (PGCC) (see note 2)

methyl isostearate (MIS)

Notes

1. "Methyl oleate" (MO) is a commercial name for a mixture of fatty acid methyl esters in which the major component (c. 73%) is methyl oleate but which also contains other unsaturated materials, namely methyl linoleate (c. 9%), methyl palmitoleate (c. 5%), methyl linolenate (c.2%) and various saturated methyl monoesters having from 4 to 18 acid moiety carbon atoms (c. 10% in total).
2. PGCC has caprylic acid and capric acid as the main acid moieties (c. 59% and c. 36% respectively) but also contains minor proportions of other acid moieties, principally lauric acid ( c. 5% ).

All of the above-listed esters are commercially-available, for example from Unichema International of Gouda, The Netherlands.

Of the above-listed esters, EHC and IPM are preferred.

In general, the acid moiety of fatty acid ester(s) suitable for use in the present solvent composition will have actually been derived from a natural oil. However, a fatty acid which is of a kind derivable from a natural oil but which was actually manufactured other than from a natural oil source could in principle be used in the present solvent composition. An ester made from acid manufactured in this way is termed a "synthesized fatty acid ester".

As an alternative to the use of a fatty acid ester or synthesized fatty acid ester, closely related esters of the kind found in naturally-occurring lipids may be employed. Such esters, which are often termed wax esters, are generally alkyl-branched esters of aliphatic carboxylic acids and aliphatic alcohols. They occur naturally in secretions of certain birds and animal skins (for example in human skin), and in yeast, fungi and other organisms. Although they occur naturally, their commercially-available forms are generally synthesized from non-naturally derived alcohol and acid starting materials. 2-ethylhexyl-2-ethylhexanoate (EHEH) is an example of a commercially-available synthesised wax ester which is usable in the present solvent compositions, and is also available from Unichema International. Further information on naturally-occurring wax esters can be found, for example, in "Chemistry and Biochemistry of Natural Waxes", edited by P. E. Kollattukudy, published by Elsevier, Amsterdam, in 1976.

Although in principle all mono- or di-functional esters of the kind defined herein are usable in the present solvent compositions, in practice certain of them have properties or side effects which may make them unsuitable. For example, the esters must have a workable viscosity when in a blend with the vegetable oil. Also, certain esters have an unacceptable odour (although this may have been due to impurities in the sample we evaluated, and would not necessarily be present in all samples). Additionally, we have found that samples of certain fatty acid esters, for example polyethyleneglycol cocoate, have a desensitizing effect, and prevent or reduce proper colour development of chromogenic material on contact with colour developer. Again, this may well be due to the presence of impurities such as polyethylene glycol, which is known as a desensitizer for pressure-sensitive copying paper. Thus when seeking to work the invention, care must be taken to screen prospective esters for drawbacks such as just discussed. Such screening does of course require only very simple tests or procedures, and needs no further description. Problems caused by the presence of undesirable impurities can of course be solved by improved purification techniques.

The relative proportions of vegetable oil and ester in the solvent composition can vary widely, but the technical benefits achievable by the use of the defined ester(s) have to be balanced against their high cost compared with the cost of vegetable oils. However, vegetable oil solvents are generally very cheap compared with petrochemical-based solvents and so the relatively high cost of the defined esters can be accommodated to a considerable extent. A further factor is that the defined esters generally have relatively poor solvating power for chromogenic materials as currently used in pressure-sensitive copying papers. This could potentially limit the amount of ester which can be used.

Taking these various factors into account, we have so far found a weight ratio of vegetable oil:ester in the range 1:3 to 3:1 to be suitable, but these values are not to be taken as in any way indicating limits of suitability.

The present solvent composition is preferably composed substantially entirely of vegetable oil(s) and the defined ester (s).

In addition to the chromogenic materials dissolved in the solvent composition, other additives may be present, for example antioxidants to counteract the well known tendency of vegetable oils to deteriorate as a result of oxidation.

In use, the present solvent composition, containing dissolved chromogenic materials, is microencapsulated and used in conventional manner.

The microcapsules may be produced by coacervation of gelatin and one or more other polymers, e.g. as described in U.S. Pat. Nos. 2,800,457; 2,800,458; or 3,041,289; or by in situ polymerisation of polymer precursor material, e.g. as described in U.S. Pat. Nos. 4,001,140; 4,100,103; 4,105,823 and 4,396,670.

The chromogenic materials used in the microcapsules may be, for example, phthalide derivatives, such as 3,3-bis(4-dimethylaminophenyl)-6-dimethylaminophthalide (CVL) and 3,3bis-(1-octyl-2-methylindol-3-yl)phthalide; fluoran derivatives, such as 2'anilino-6'-diethylamino-3'-methylfluoran, 6' -dimethylamino-2'-(N-ethyl-N-phenylamino-4'-methylfluoran), 2' -N-methyl-N-phenylaminofluoran-6'-N-ethyl-N(4-methylphenylaminofluoran, or 3'-chloro-6'-cyclohexylaminofluoran; or spirobipyran derivatives such as 3'-i-propyl-7-dibenzylamino-2,2'-spirobi-(2H-l-benzopyran). Triphenylmethyl chromogenic materials as disclosed in European Patent Application No. 262569A may also be used.

The chromogen-containing microcapsules, once produced, are formulated into a coating composition with a suitable binder, for example starch or a starch/carboxymethylcellulose mixture, and a particulate agent (or "stilt material") for protecting the microcapsules against premature microcapsule rupture. The stilt material may be, for example, wheatstarch particles or ground cellulose fibre floc or a mixture of these. The resulting coating composition is then applied by conventional coating techniques, for example metering roll coating or air knife coating.

Apart from the solvent composition, the present pressure-sensitive copying paper may be conventional. Such paper is very widely disclosed in the patent and other literature, and so requires only brief further discussion.

The thickness and grammage of the present paper (before microcapsule coating) may be as is conventional for this type of paper, for example the thickness may be about 60 to 90 microns and the grammage about 35 to 50 g $m^{-2}$, or higher, say up to about 100 g $m^{-2}$, or even more. This grammage depends to some extent on whether the final paper is for CB or CFB use. The higher grammages just quoted are normally applicable only to speciality CB papers.

The colour developer material used may be an acid clay, e.g. as described in U.S. Pat. No. 3,753,761; a phenolic resin, e.g. as described in U.S. Pat. No. 3,672,935 or U.S. Pat. No. 4,612,254; or an organic acid or metal salt thereof, e.g. as described in U.S. Pat. No. 3,024,927, European Patent Applications Nos. 275107A or 428994A, or German Offenlequngsshrift No. 4110354A.

The invention will now be illustrated by the following Examples in which all parts, percentages and proportions are by weight unless otherwise stated.

EXAMPLE 1

This illustrates the use of a solvent composition comprising rapeseed oil (RSO) and 2-ethylhexylcocoate (EHC) in 3:1 and 1:1 ratio, with a 100% rapeseed oil solvent composition as a control for comparison purposes.

Chromogenic materials were first dissolved in the solvent compositions to produce solutions for encapsulation. These chromogenic materials are all commercially available and have a long history of use in the art. They were principally CVL, a green fluoran and an orange fluoran, with smaller amounts of a blue spirobipyran chromogen and a red bisindolyl phthalide chromogen, and were used in relative proportions such as to give a black print, as is conventional in the art. The total colour former concentrations were 5.0% in the case of the RSO/EHC compositions and 6.4% in the case of the 100% RSO composition.

The resulting chromogenic material solutions were encapsulated on a pilot plant scale by means of a generally conventional gelatin coacervation technique as disclosed in British Patent No. 870476, using carboxymethyl cellulose and vinylmethylether/maleic anhydride copolymer as anionic colloids. As an initial step of the encapsulation process, the chromogenic material solution was dispersed with stirring in gelatine solution, and the resulting dispersion was then milled to a target median droplet size of 3.2±0.2 μm (as measured by means of a Coulter Counter). The milling times required to achieve this median primary droplet size were 45 and 49 minutes for the 3:1 and 1:1 RSO:EHC compositions respectively, and 60 minutes for the 100% RSO composition. Thus the inclusion of a proportion of EHC produces a significant saving in milling time.

The Coulter Counter was also used to measure the percentage of droplets in different size ranges, so as to permit a droplet size distribution to be derived. This showed that the percentage of "oversize" droplets, defined as droplets of a size greater than 6.35 μm, was 2.9% for the 3:1 RSO:EHC composition, 1.8% for the 11 RSO/EHC composition and 3.5% for the 100% RSO composition. Again therefore, the inclusion of a proportion of EHC resulted in significant benefits.

This was corroborated by IQD calculations (IQD=Inter-Quartile Distance). IQD is a measure of the spread of droplet size distribution and is the difference between the upper and lower droplet sizes. The smaller the IQD value the narrower (i.e. better) the droplet size distribution. The IQD values were 1.89 μm for the 3:1 RSO:EHC composition, 1.73 μm for the 1:1 RSO:EHC composition, and 1.99 μm for the 100% RSO composition.

The microencapsulation process was then completed in conventional manner. Specifically, the dispersion was diluted with additional water and vinylmethyl ether/maleic anhydride copolymer solution was added. After heating to 50°–55° C., carboxymethylcellulose solution was added. Acetic acid was then added to adjust the pH to about 4.2 and thereby bring about coacervation. The coacervate deposited about the emulsified oil droplets so as to form liquid-walled microcapsules. The mixture was then chilled to about 10° C. to solidify the initially-liquid coacervate walls, after which a hardening agent (glutaraldehyde) was added to cross-link the walls and prevent their re-dissolving when the temperature rises when the chilling operation is concluded. A further addition of vinylmethylether/maleic anhydride copolymer was then made. The resulting microcapsule dispersion was then adjusted to pH 7 with sodium hydroxide solution.

The finished microcapsule dispersion was formulated into a conventional CB coating composition using a gelatinized starch binder and ground cellulose fibre floc as an agent for preventing premature microcapsule rupture. This CB coating composition was applied to the uncoated surface of commercially-available 46 g $m^{-2}$ CF paper by means of a pilot scale metering roll coater at CB coatweights (when dry) in the range 3.7 to 7.4 g $m^{-2}$. The CF paper utilised acid-washed dioctahedral montmorillonite clay as the active colour developing ingredient.

The resulting paper was subjected to the following tests:

1. Calender Intensity (CI) Test

This involved superimposing a strip of the microcapsule-coated paper under test onto a strip of conventional acid-washed montmorillonite colour developer coated paper, passing the superimposed strips through a laboratory calender to rupture the capsules and thereby produce a colour on the colour developer strip, measuring the reflectance of the thus-coloured strip (I) and expressing the result ($I/I_o$) as a percentage of the reflectance of an unused control colour developer strip ($I_o$). Thus the lower the calender intensity value ($I/I_o$), the more intense the developed colour.

The reflectance measurements were done both two minutes after calendering and forty-eight hours after calendering, the sample being kept in the dark in the interim. Measurements were made both after two minutes and after forty-eight hours, so as to allow for the effect of additional colour development with time.

In each case the calender intensity value is indicative of the ability of the microcapsule-coated paper to give rise to a good copy image.

2. Post-Printing Discolouration i. Extended Ram Test

This is intended to simulate the effect of post-printing discolouration (as described earlier). A stack of twenty CFB sheets of each sample was placed under a hydraulic ram and subjected to a nominal ram pressure of 1724 kPa (250 p.s.i) for 30 minutes. The extent of discolouration was assessed visually.

ii. Visual Examination After Printing

This needs no further explanation.

3. Discolouration on Storage Tests i. Contact Storage

A stack of twenty CFB sheets of each sample, all with their CF surfaces uppermost, were placed under a 2 kg weight in an oven at 40° C. for 3 weeks. A second stack was similarly tested at 60° C. for 3 weeks. The extent of discolouration on the CF surfaces was assessed visually.

ii. Accelerated Ageing

Single CFB sheets of each sample were placed in ovens under the following conditions, which are believed to simulate the effect of extended storage prior to use in various parts of the world, particularly those with hot climates where discolouration on storage is most problematical.

45 minutes at 150° C.
3 days at 32° C. and 90% relative humidity
3 weeks at 32° C. and 90% relative humidity
3 weeks at 40° C.
3 weeks at 60° C.

Again, the extent of discolouration on the CF surfaces was assessed visually.

The results of calender intensity tests are set out in Table 1 below:

TABLE 1

| Solvent Composition | Dry CB Coatweight (g $m^{-2}$) | Calender Intensity 2 min. | 48 hour |
|---|---|---|---|
| 3:1 | 4.5 | 72.7 | 63.0 |
| RSO:EHC | 5.1 | 70.6 | 60.5 |
| | 5.7 | 67.9 | 57.5 |
| | 6.7 | 69.0 | 58.1 |
| | 7.1 | 67.3 | 56.8 |
| 1:1 | 3.7 | 72.4 | 63.6 |
| RSO:EHC | 4.7 | 69.6 | 60.1 |
| | 4.6 | 68.4 | 58.7 |
| | 5.4 | 67.1 | 57.4 |
| | 6.6 | 66.0 | 55.6 |
| 100% | 5.1 | 70.2 | 59.0 |
| RSO | 5.5 | 68.4 | 56.9 |
| (Control) | 6.0 | 68.2 | 56.9 |
| | 6.9 | 67.6 | 55.8 |
| | 7.4 | 66.9 | 55.0 |

Exact comparisons are difficult because of the different dry CB coatweights obtained, but it will be seen that in general the RSO:EHC compositions give similar calender intensity results to those of the 100% RSO composition, despite having a lower concentration of dissolved chromogen. This indicates that the inclusion of a proportion of EHC does not have any unacceptable effects on copy-forming capability, and indeed improves copy intensity.

The extended ram test indicated a higher level of discolouration for the 100% RSO composition than for either of the compositions containing EHC. The discolouration was lower for the 1:1 RSO:EHC: composition than for the 3:1 RSO:EHC composition. This result was confirmed by examination of 5500 m reels of each CFB test paper which had been printed on a Muller-Martini four-colour press, examination being carried out one week and four weeks after printing. The fact that the extended ram tests were consistent with those for paper which had actually been printed shows that the extended ram test is a good predictor of post-print discolouration behaviour.

In the contact storage and accelerated ageing tests, the extent of sheet discolouration was lower under all conditions for the compositions containing EHC than for the 100% RSO composition. The discolouration was lower for the 1:1 RSO:EHC composition than for the 3:1 RSO:EHC composition.

EXAMPLE 2

This again illustrates the use of a 1:1 RSO:EHC solvent composition, but this time with a 100% RSO control having exactly the same total colour former concentration (5.0%) as the solvent composition according to the invention. The procedure was as described in Example 1, except that in the final coating composition, the binder was a mixture of gelatinized starch and carboxymethyl cellulose, and the agent for preventing premature microcapsule rupture was a mixture of wheatstarch particles and ground cellulose fibre floc.

The milling times and the results of primary droplet size testing were as set out in table 2a below:

TABLE 2a

| Solvent Composition | Median Droplet Size (μm) | Milling Time (min) | I.Q.D. | % Oversize* |
|---|---|---|---|---|
| RSO/EHC | 3.05 | 43 | 2.18 | 3.1 |
| 100% RSO | 3.11 | 53 | 2.22 | 3.7 |

*As defined in Example 1

It will be seen that the inclusion of a proportion of EHC resulted in a significantly reduced milling time and minor improvements in IQD and % Oversize values The results of calender intensity tests are set out in Table 2b below:

TABLE 2b

| Solvent Compositon | Dry CB Coatweight (g $m^{-2}$) | Calender Intensity 2 min. | 48 hour |
|---|---|---|---|
| RSO/EHC | 5.0 | 72.7 | 63.7 |
| | 5.4 | 69.1 | 60.8 |
| | 5.5 | 67.0 | 58.0 |
| | 6.0 | 67.4 | 58.8 |
| | 6.6 | 65.6 | 56.6 |
| 100% RSO | 4.3 | 77.2 | 67.8 |
| | 4.9 | 74.3 | 64.6 |
| | 5.6 | 73.5 | 63.1 |
| | 6.2 | 71.5 | 60.7 |
| | 6.9 | 69.8 | 58.8 |

It will be seen that the inclusion of a proportion of EHC into the RSO resulted in significantly improved intensity values at comparable coatweights.

The extended ram test was carried out only on the 5.4 g $m^{-2}$ CB coatweight RSO/EHC sample and the 4.9 g $m^{-2}$ CB coatweight 100% RSO sample. It indicated a higher level of discolouration for the 100% RSO composition than for the RSO/EHC composition, despite the lower coatweight of the former. This was confirmed by visual examination of test paper which had actually been printed—in this case the difference in discoloration was more marked than it had been in the extended ram test.

In the contact storage and accelerated ageing tests, the extent of sheet discolouration was lower under all conditions for the composition containing EHC than for the 100% RSO composition.

EXAMPLE 3

This illustrates the use of a solvent composition containing less than 50% by weight of vegetable oil, namely a 2:3 RSO:EHC composition (i.e. 40% RSO). The control solvent composition was 100% RSO. The procedure was as described in Example 1, except that different milling equipment was used and that the final coating composition was formulated as described in Example 2. The total chromogenic material concentration was 6.4% in each case, instead of 5.0%.

Milling times and the results of primary droplet size testing were as set out in Table 3a below:

TABLE 3a

| Solvent Composition | Median Droplet Size (μm) | Milling Time (min) | I.Q.D. | % Oversize* |
|---|---|---|---|---|
| RSO/EHC | 3.15 | 55 | 1.70 | 1.7 |
| 100% RSO | 3.20 | 105 | 2.12 | 4.7 |

*As defined in Example 1

It will be seen that the inclusion of a proportion of EHC resulted in a dramatic reduction in milling time and a significant improvement in IQD and % Oversize values. The higher milling times recorded in this Example compared with previous examples are thought to be a consequence of the different milling equipment used.

The results of calender intensity tests are set out in Table 3b below:

TABLE 3b

| Solvent Compositon | Microcapsule Coatweight (g m$^{-2}$) | Calender Intensity 2 min. | Calender Intensity 48 hour |
|---|---|---|---|
| RSO/EHC | 3.7 | 70.9 | 60.8 |
| | 4.2 | 68.1 | 57.6 |
| | 5.4 | 65.4 | 54.6 |
| | 6.1 | 64.3 | 53.5 |
| | 6.6 | 63.5 | 52.6 |
| 100% RSO | 3.9 | 72.2 | 61.3 |
| | 4.2 | 69.4 | 58.8 |
| | 5.2 | 67.6 | 57.0 |
| | 6.0 | 66.7 | 56.0 |
| | 7.0 | 65.8 | 55.0 |

It will be seen that the inclusion of a large proportion of EHC into the RSO resulted in slightly improved intensity values, at comparable coatweights.

The extended ram test was carried out only on the 5.4 g m$^{-2}$ CB coatweight RSO/EHC sample and the 5.2 g m$^{-2}$ CB coatweight 100% RSO sample. It indicated a slightly higher level of discolouration for the 100% RSO composition than for the RSO/EHC composition. This was confirmed by visual examination of test paper which had actually been printed. As with Example 2, the difference in discolouration was more marked than it had been in the extended ram test.

Accelerated ageing tests were carried out under the following conditions:

(a) 45 minutes at 150° C.

(b) 3 days at 40° C.

(c) 3 days at 60° C.

(d) 3 weeks at 40° C.

(e) 3 weeks at 60° C.

It was found that the RSO/EHC samples discoloured less than those of the 100% RSO samples.

Contact storage testing was also carried out, and the RSO/EHC samples showed less discolouration than the 100% RSO samples.

EXAMPLES 4

This illustrates the use of a range of different vegetable oils and of a range of different fatty acid esters.

The procedure was similar to that described in Example 1 above except that encapsulation was carried out. on a laboratory scale, and a smaller pilot-plant coater was used, namely a Dixon pilot plant coater. The smaller scale of this work precluded full print testing, which requires long reels, and so post-printing discolouration was evaluated solely by means of the extended ram test.

The vegetable oils used were rapeseed oil (RSO), sunflower oil (SFO), soybean oil (SBO) and corn oil (CO).

The fatty acid esters used were 2-ethylhexyl cocoate (EHC), isopropyl myristate (IPM), methyl oleate (MO), glyceryl tri-caprylate caprate (GTCC) and polypropylene glycol di-caprylate/caprate (PGCC). The compositions of the MO and PGCC were as described in more detail earlier in this specification. The GTCC had caprylic acid and capric acid as the main acid moieties (c. 61% and c. 19% respectively) but also contained minor proportions of other acid moieties, principally lauric acid (c. 9%), myristic acid (c. 6%) and butyric and caproic acids (c. 2% in total). GTCC is a tri-functional ester and its use is therefore not in accordance with the invention.

The specific solvent compositions were chosen to complement those evaluated in Examples 1, 2, and 3, and were as follows:

1:1 RSO:IPM

1:1 RSO:MO

1:1 RSO:GTCC

1:1 RSO:PGCC

1:1 SBO:EHC

1:1 SFO:EHC

1:1 CO:EHC

100% RSO (Control)

100% SFO (Control)

100% SBO (Control)

100% CO (Control)

The mixture of dissolved chromogenic materials and their concentration (5.0%) was in each case as described for the RSO/EHC solvent compositions of Example 2. The encapsulation procedure was likewise as described in Example 1, except that it was carried out on a laboratory rather than pilot-plant scale. The microcapsules were formulated and coated on to CF paper largely as described in Example 1 except that the binder was a mixture of gelatinized starch and carboxymethylcellulose, and the agent for preventing premature microcapsule rupture was a mixture of wheatstarch particles and ground cellulose fibre floc.

The evaluation testing was generally as described in Example 1, except that no printing was carried out, as outlined above.

The results of primary droplet size testing were as set out in Table 4a below:

TABLE 4a

| Solvent Composition | Median Droplet Size (μm) | Milling Time (min) | I.Q.D. | % Oversize*. |
|---|---|---|---|---|
| RSO/IPM | 3.10 | 41 | 1.71 | 0.8 |
| RSO/MO | 3.04 | 30 | 1.63 | 0.8 |
| RSO/GTCC | 3.08 | 32 | 1.90 | 1.7 |
| RSO/PGCC | 3.05 | 31 | 1.69 | 0.3 |
| SBO/EHC | 3.18 | 43 | 1.63 | 1.0 |
| SFO/EHC | 3.18 | 55 | 1.61 | 0.6 |
| CO/EHC | 3.18 | 46 | 1.64 | 0.7 |
| 100% RSO | 3.13 | 45 | 1.48 | 2.0 |
| 100% SFO | 3.12 | 63 | 1.92 | 1.8 |
| 100% SBO | 3.14 | 45 | 1.96 | 2.6 |
| 100% CO | 3.15 | 50 | 1.88 | 2.1 |

*As defined in Example 1

It will be seen that in each case, the introduction of fatty acid ester gave improved results in some or all tests compared with the corresponding pure vegetable oil. Whilst the 100% RSO had an exceptionally low IQD, it gave worse % Oversize results and longer milling times than when mixed with fatty acid ester.

The mixture of RSO and GTCC required a relatively short milling time, but its IQD value was comparable to the highest of the IQD values for the pure vegetable oils. Its % oversize value was higher than for the mono- and di-ester blends.

The results of calender intensity testing are set out in Table 4b below. Microcapsule coatweights were not measured, but since all were to the same target value, and were applied using the same coating equipment on the same base paper, they are assumed to be similar.

TABLE 4b

| Solvent | Calender Intensity | |
|---|---|---|
| Composition | 2 min. | 8 hours |
| RSO/IPM | 72.8 | 63.1 |
| RSO/MO | 70.1 | 64.2 |
| RSO/GTCC | 78.9 | 67.2 |
| RSO/PGCC | 77.3 | 66.3 |
| SBO/EHC | 71.6 | 62.3 |
| SFO/EHC | 73.0 | 64.5 |
| CO/EHC | 69.3 | 60.3 |
| 100% RO | 74.7 | 65.1 |
| 100% SFO | 79.4 | 71.2 |
| 100% SBO | 76.2 | 68.2 |
| 100% CO | 75.3 | 65.8 |

It will be seen that after 2 minutes development, most of the compositions according to the invention gave a more intense colour than the 100% vegetable oil compositions, but that RSO/GTCC and RSO/PGCC were less intense. After 48 hours development, the pattern was similar, although the RSO/GTCC and RSO/PGCC compositions were now of comparable intensity to the 100% vegetable oil composition. It is thought that the relatively poor performance of the RSO/PGCC composition may have been due to the presence of small quantities of desensitizing impurities as discussed earlier. This may also have been a factor in the RSO/GTCC results, in addition to the chemical similarity of glyceryl esters and natural vegetable oils as discussed earlier.

In the extended ram test, an Elrepho reflectance tester was used to measure the reflectance of the samples before and after compression with the ram. The wave length of light used was 600 nm. The results were as set out in Table 4c below:

TABLE 4c

| Solvent | Reflectance (%) | | |
|---|---|---|---|
| Composition | Before | After | Difference |
| RSO/IPM | 91.1 | 92.4 | 1.3 |
| RSO/MO | 90.9 | 92.3 | 1.4 |
| RSO/GTCC | 90.7 | 92.4 | 1.7 |
| RSO/PGCC | 91.0 | 92.6 | 1.6 |
| SBO/EHC | 91.2 | 92.6 | 1.4 |
| SFO/EHC | 90.9 | 92.3 | 1.4 |
| CO/EHC | 91.0 | 92.6 | 1.6 |
| 100% RO | 90.0 | 92.0 | 2.0 |
| 100% SFO | 90.7 | 92.3 | 1.6 |
| 100% SBO | 89.9 | 92.4 | 2.5 |
| 100% CO | 89.8 | 91.8 | 2.0 |

It will be seen that all the 100% vegetable oil samples showed greater discolouration in the extended ram test than the corresponding vegetable oil/fatty acid ester compositions, although in the case of sunflower oil, the difference was not large. The values for RSO/PGCC and RSO/GTCC were intermediate between the pure oil and the oil/monofunctional ester values.

In the contact storage test, the 100% vegetable oil samples showed worse discolouration than the vegetable oil/fatty acid ester samples, with the exception of the RSO/GTCC sample, which was better than 100% RSO but comparable to the other 100% vegetable oils.

In the accelerated ageing test, no significant discolouration was observed for any of the samples after 4 weeks at 32° C. and 90% RH.

EXAMPLE 5

This illustrates the use of a solvent composition containing a smaller proportion of vegetable oil than in previous examples, namely a 1:3 blend of RSO and EHC (i.e. 25% RSO). The procedure was as described in Example 2, although no 100% RSO control was run.

The milling time required to achieve the target median droplet size of 3.2+0.2 μm (as measured by a Coulter Counter) was 40 minutes, the percentage of "oversize" droplets, as defined previously, was 2.5%, and the IQD value was 1.69. All of these values are comparable with values obtained in previous examples, which demonstrates that a 1:3 blend of RSO and EHC gives comparable benefits to those obtained with earlier-exemplified compositions.

The results of calender intensity tests are set out in Table 5 below:

TABLE 5

| Solvent | Dry CB Coatweight | Calender Intensity | |
|---|---|---|---|
| Composition | (g $m^{-2}$) | 2 min. | 48 hour |
| RSO/EHC | 4.0 | 73.2 | 64.8 |
| 1:3 | 5.0 | 70.0 | 61.3 |
| | 5.8 | 69.5 | 60.4 |
| | 6.6 | 68.0 | 59.0 |
| | 6.8 | 65.5 | 55.3 |

These values are likewise comparable to those obtained with papers utilising earlier-exemplified compositions according to the invention.

The extended ram test also gave a degree of discolouration comparable to that shown with papers utilising earlier-exemplified compositions according to the invention. Visual examination of the paper after printing also demonstrated the comparability of the 1:3 RSO/EHC paper and other papers according to the invention.

EXAMPLE 6

This illustrates the use of a further three vegetable oils, namely groundnut oil (GNO), coconut oil (CNO) and cottonseed oil (CSO), and a further two esters (EHEH and MIS). The procedure was generally as described in Example 1 except that (a) it was carried out on a laboratory scale (b) the chromogenic material blend was a 5% total concentration mixture of CVL, a green fluoran, a black fluoran and a red bis-indolyl phthalide, and (c) the agent for preventing premature microcapsule rupture was a mixture of wheat-starch particles and ground cellulose fibre floc.

The specific solvent compositions evaluated were as follows:

1:1 GNO:EHEH
1:1 CSO:MIS
1:1 CNO:EHC
1:1 RSO:GTEH (see note 1)
1:1 RSO:EHC (see note 2)
100% RSO (control)
100% GNO (control)
100% CSO (control)
100% CNO (control)

Notes

1. GTEH is glyceryl tris (2-ethylhexanoate). Though its use is not within the invention as defined, this trifunctional ester was included in order to evaluate its performance in a vegetable oil/fatty acid ester solvent composition.
2. This composition was exemplified in previous Examples, but was included in this evaluation to assist assessment of the performance of the oils and esters being evaluated for the first time.

The results of primary droplet size testing were as set out in Table 6a below. No meaningful milling time data was obtained on this occasion because of problems with the milling equipment used.

TABLE 6a

| Solvent Composition | Median Droplet Size (μm) | I.Q.D. | % Oversize* |
|---|---|---|---|
| GNO/EHEH | 3.2 | 1.6 | 0.6 |
| CSO/MIS | 3.2 | 1.6 | 1.3 |
| CNO/EHC | 3.2 | 1.6 | 0.5 |
| RSO/GTEH | 3.2 | 1.8 | 2.2 |
| RSO/EHC | 3.2 | 1.6 | 1.5 |
| 100% RSO | 3.2 | 1.9 | 1.6 |
| 100% GNO | 3.2 | 2.0 | 1.7 |
| 100% CSO | 3.1 | 1.9 | 2.0 |
| 100% CNO | 3.2 | 1.8 | 2.6 |

*Defined as in Example 1

It will be seen that the oil/ester mixtures gave rise to lower I.Q.D. values and % oversize values than the oils alone, with the exception of the RSO/GTEH blend, which is of course not according to the invention.

The results of calender intensity testing (the mean of three determinations in each case) are set out in Table 6b below:

TABLE 6b

| Solvent | Dry CB Coatweight | Calender Intensity | |
|---|---|---|---|
| Composition | ($g\ m^{-2}$) | 2 min | 48 hour |
| GNO/EHEH | 4.2 | 64.3 | 60.6 |
| CSO/MIS | 4.7 | 64.3 | 60.1 |
| CNO/EHC | 5.3 | 63.1 | 58.3 |
| RSO/GTEH | 4.3 | 69.1 | 64.3 |
| RSO/EHC | 4.7 | 62.3 | 59.8 |
| 100% RSO | 4.5 | 67.6 | 62.8 |
| 100% GNO | 4.3 | 73.8 | 68.6 |
| 100% CSO | 4.4 | 68.8 | 63.8 |
| 100% CNO | 4.7 | 71.9 | 67.1 |

It will be seen that the oil/ester mixture samples gave rise to a more intense colour than the oils alone, with the exception, as before, of the RSO/GTEH blend.

In the extended ram test, an Elrepho reflectance tester was used to measure the reflectance of the samples before and after compression with the ram. The wave length of light used was 600 nm. The results were as set out in Table 6c below:

TABLE 6c

| Solvent | Reflectance (%) | | |
|---|---|---|---|
| Composition | Before | After | Difference |
| GNO/EHEH | 92.1 | 91.5 | 0.6 |
| CSO/MIS | 92.0 | 90.8 | 1.2 |
| CNO/EHC | 91.6 | 90.9 | 0.7 |
| RSO/GTEH | 91.7 | 91.0 | 0.7 |
| RSO/EHC | 91.8 | 91.1 | 0.7 |
| 100% RSO | 91.3 | 90.4 | 0.9 |
| 100% GNO | 91.6 | 91.1 | 0.5 |
| 100% CSO | 91.6 | 90.7 | 0.9 |
| 1004 CNO | 91.6 | 91.1 | 0.5 |

It will be seen that no clear trend emerges. Possibly this is a consequence of the relatively small differences in reflectance observed in this experiment compared with those observed in Example 4.

After accelerated ageing testing for 1 week at 32° C. and 90% relative humidity, the GNO/EHEH sample showed the least discolouration, followed by the RSO/EHC sample, 100% RSO and 100% GNO. The remaining samples all suffered from discolouration to about the same extent. In a separate set of tests for 3 weeks at 40° C., all the samples showed little discolouration. On testing for 3 weeks at 60° C., all the vegetable oil/ester mixture samples showed less discolouration than the 100% vegetable oil samples, with the exception of the 100% CNO sample, which was the best of the samples on test.

In the contact storage test, 100% CNO again performed best, followed by the vegetable oil/ester mixture samples and then the remaining 100% vegetable oil samples. The RSO/GTEH sample was the worst of the vegetable oil/ester mixture samples.

It is thought that the unexpectedly good performance of the 100% coconut oil sample compared with other 100% oil samples is a consequence of the fact that coconut oil solidifies at around ambient temperature, and therefore perhaps flows less freely and hence produces less undesired colouration.

EXAMPLE 7

This illustrates the use of triphenylmethane carbinol or carbinol derivative chromogenic materials in the present solvent composition.

The solvent composition in each case was 1:1 RSO:EHC, with a 100% RSO control. The chromogenic materials were:

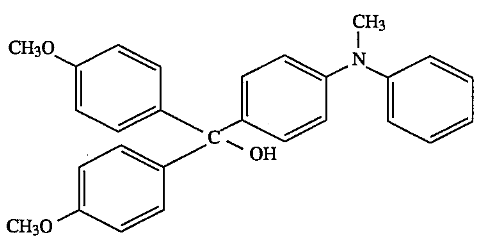

(1)

(Example 1 of European Patent Application No. 234394A) and

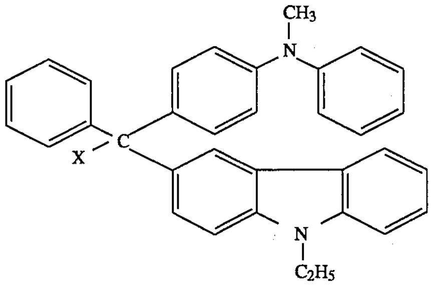
(2)

where X is a mixture of —OH and —$OCH_3$ (Example 2 of European Patent Application No. 303942A).

A small proportion (less than 2%) of a dialkylnaphthalene was present as an impurity in the case where chromogenic material (1 ) was used.

The milling times and the results of primary droplet size testing were as set out in Table 7 below:

TABLE 7

| Solvent Composition (Chromogen No.) | Median Droplet Size (μm) | Milling Time (min) | I.Q.D. | %* Oversize |
|---|---|---|---|---|
| RSO/EHC (1) | 3.19 | 43 | 1.81 | 3.0 |
| 100% RSO (1) | 3.17 | 51 | 2.35 | 6.1 |
| RSO/EHC (2) | 3.15 | 45 | 1.58 | 0.7 |
| 100% RSO (2) | 3.13 | 38 | 1.98 | 3.7 |

*As defined in Example 1

It will be seen that the solvent compositions according to the invention both gave significantly better I.Q.D. and % oversize results than the respective controls. The milling time data is contradictory.

EXAMPLE 8

This illustrates the use of the present solvent composition with an encapsulation system relying on in situ polymerisation of aminoplast precondensate for microcapsule wall formation rather than on coacervation of gelatin and other colloids (as in the case of the previous Examples). The aminoplast encapsulation system used is disclosed in full in U.S. Pat. No. 4,105,823.

The solvent composition was a 50:50 mixture of RSO and EHC. A parallel experiment was carried out as a control, using a 100% RSO solvent composition.

274 g of a 20% solids content aqueous dispersion of an acrylic acid/acrylamide copolymer having an acrylic acid content of 42% by weight ("R144" supplied by Allied Colloids Limited, of Bradford, England) were mixed with 1011 g water, and the mixture was held at 50° C. by means of a water bath. 65 g of 20% solids content urea-formaldehyde precondensate ("BC777" supplied by British Industrial Plastics Limited of Warley, England) were added. The resulting mixture was held in the water bath for 40 minutes before being removed. 243 g of water was added and 1232 ml of chromogenic material solution were added (the chromogenic material solution was similar to that used in Example 6). The resulting emulsion was then milled as described in previous Examples, except that the target droplet size was around 5 μm.

The milling times and the results of primary droplet size testing were as set out in Table 8 below:

TABLE 8

| Solvent Composition | Median Droplet Size (μm) | Milling Time (min) | I.Q.D. | %* Oversize |
|---|---|---|---|---|
| RSO/EHC | 5.2 | 35 | 2.0 | 3.0 |
| 100% RSO (1) | 5.2 | 35 | 2.6 | 8.1 |

*Defined an droplets of diameter greater than 8 μm (this different standard, compared with previous Examples, is a consequence of the different encapsulation system being used).

It will be seen that the solvent composition according to the invention gave better I.Q.D. and oversize values than the control.

We claim:

1. A solvent composition for use in pressure-sensitive copying paper and comprising a solvating combination of (i) a vegetable oil and (ii) a proportion of a mono- or di-functional ester of a non-aromatic mono-carboxylic acid having a saturated or unsaturated straight or branched hydrocarbon chain with at least three carbon atoms in the chain.

2. A solvent composition as claimed in claim 1 wherein the ester is a fatty acid ester or a synthesized fatty acid ester.

3. A solvent composition as claimed in claim 2 wherein the ester is 2-ethylhexyl cocoate or isopropyl myristate.

4. A solvent composition as claimed in claim 1 wherein the ester is a naturally-occurring lipid or a synthesized such lipid.

5. A solvent composition as claimed in claim 4 wherein the ester is 2-ethylhexyl-2-ethylhexanoate.

6. A solvent composition as claimed in claim 1 wherein the vegetable oil is selected from the group consisting of rapeseed oil, soya bean oil, sunflower oil, and corn oil.

7. A solvent composition as claimed in claim 1 wherein the weight ratio of vegetable oil:ester is in the range 1:3 to 3:1.

8. A solvent composition as claimed in claim 1, wherein the vegetable oil is rapeseed oil and the ester is 2-ethylhexyl cocoate.

9. Pressure-sensitive copying paper comprising a solvent composition as claimed in claim 1.

10. A solvent composition for use in pressure-sensitive copying paper comprising a solvating combination of (i) at least one vegetable oil and (ii) at least one mono- or di-functional ester of a non-aromatic mono-carboxylic acid having a saturated or unsaturated straight or branched hydrocarbon chain with at least three carbon atoms in the chain, the combination of vegetable oil(s) and mono- or di-functional ester(s) together being effective for solvating a chromogenic material.

* * * * *